(12) United States Patent  
Davito

(10) Patent No.: US 9,527,379 B2
(45) Date of Patent: Dec. 27, 2016

(54) FILL PIPE ANTI-SIPHON DEVICE AND METHOD OF USE

(71) Applicant: Carlos Davito, Mesa, AZ (US)

(72) Inventor: Carlos Davito, Mesa, AZ (US)

( * ) Notice: Subject to any disclaimer, the term of this patent is extended or adjusted under 35 U.S.C. 154(b) by 0 days.

(21) Appl. No.: 14/570,618

(22) Filed: Dec. 15, 2014

(65) Prior Publication Data

US 2015/0306952 A1 Oct. 29, 2015

Related U.S. Application Data

(63) Continuation-in-part of application No. 14/260,637, filed on Apr. 24, 2014.

(51) Int. Cl.
*B60K 15/04* (2006.01)

(52) U.S. Cl.
CPC ................................. *B60K 15/0403* (2013.01)

(58) Field of Classification Search
CPC .. F16L 55/16; B60K 15/04; B60K 2015/0458; B60K 15/0403
USPC ........... 220/254.8, 649, 86.1, 639, 640, 641, 657,220/659, 661, 676, 86.3; 411/178, 176; 138/136; 277/610, 612, 614, 608
See application file for complete search history.

(56) References Cited

U.S. PATENT DOCUMENTS

| 3,726,549 | A | | 4/1973 | Bradley, Jr. | |
|---|---|---|---|---|---|
| 4,113,290 | A | | 9/1978 | Miida | |
| 4,210,374 | A | | 7/1980 | Churla | |
| 4,417,754 | A | * | 11/1983 | Yamaji | ..................... F16L 21/08 |
| | | | | | 285/104 |
| 5,232,028 | A | * | 8/1993 | Sunderhaus | ......... B67D 7/0288 |
| | | | | | 137/588 |
| 5,472,025 | A | | 12/1995 | Conrad et al. | |
| 6,371,319 | B2 | | 4/2002 | Yeaton et al. | |
| 6,830,085 | B1 | | 12/2004 | Majewski | |
| 6,851,565 | B2 | | 2/2005 | Stephan | |
| 6,910,720 | B2 | | 6/2005 | Shimei | |
| 7,819,613 | B2 | | 10/2010 | Strom | |
| 8,292,103 | B2 | | 10/2012 | Weist | |
| 8,348,090 | B2 | | 1/2013 | Crager et al. | |
| 8,439,617 | B2 | | 5/2013 | Strom | |
| 2003/0029829 | A1 | | 2/2003 | Stephan | |
| 2007/0136807 | A1 | * | 6/2007 | DeLiberato | ............. G06F 21/55 |
| | | | | | 726/22 |
| 2009/0110509 | A1 | | 4/2009 | Strom | |
| 2013/0256305 | A1 | * | 10/2013 | Schuller | ................. B60K 15/04 |
| | | | | | 220/86.1 |

* cited by examiner

*Primary Examiner* — Robert J Hicks
*Assistant Examiner* — Kareen Thomas
(74) *Attorney, Agent, or Firm* — Schmeiser, Olsen & Watts, LLP

(57) ABSTRACT

A device and method of use for a fill pipe anti-siphon device are described. The device and method of use are designed to provide a simple, reliable, cost-effective means to prevent theft of fuel or other liquids from holding tanks, such as a fuel tank on a semi-tractor trailer diesel truck, by siphoning. The device is a barrier which prevents insertion of a siphon hose or tube of suitable diameter to efficiently siphon fuel of other liquid from a tank. The barrier device allows for the simultaneous filling of a tank through a fill pipe neck while venting an from the tank at a sufficient rate to prevent or minimize backflow of fuel or other liquid during fueling or tank filling from the tank when using a high-flow fill nozzle.

13 Claims, 6 Drawing Sheets

FILL PIPE ANTI-SIPHON DEVICE AND METHOD OF USE

CROSS REFERENCE TO RELATED APPLICATIONS

This application is a continuation in part of the earlier U.S. Utility Patent Application to Carlos Davito entitled "Fill Pipe Repair Collar and Method of Use," Ser. No. 14/260,637, filed Apr. 24, 2014, now pending, the disclosures of which are hereby incorporated entirely herein by reference.

BACKGROUND OF THE INVENTION

Technical Field

This invention relates to a device and method for deterring theft of fuel from a fuel tank Specifically, the invention relates to a fill-pipe anti-siphon device and method of use.

State of the Art

The trucking industry generates approximately $650 billion of annual revenue and is responsible for over 80% of all commercial transportation based on revenue generated. There are around two million semi tractor-trailer trucks registered in the United States. A typical truck travels between 45,000 and 100,000 miles annually, depending on whether the unit's usage is regional or "long haul." Therefore, any commonly occurring condition which renders a semi-truck tractor inoperable can have a substantial economic impact.

Additionally, the theft of diesel by siphoning from semi-truck fuel tanks is widespread. Trucks parked at a truck stop, a motel, restaurant, or loading yard are prime targets for diesel thieves. Anti-siphon devices are available, but are inconvenient to use and have limitations. Locking fuel caps require a key which may be damaged or lost. Barrier devices are typically fitted with flanges that expand on insertion and permanently catch on the inside of the tank preventing removal of the device. Poorly designed barrier devices may also impede the flow of fuel from high-flow fueling pumps present at truck stops, causing spills of fuel foaming up around the fill nozzle.

A common example of a condition rendering a truck temporarily inoperable is fuel leaking from damaged threads on the fuel tank's fill-pipe neck. A standard rig has two side-mounted liquid fuel tanks, each with a capacity of approximately 150 gallons. Each tank has a fill pipe and is sealed by a threaded cap screwed onto the end of the fill pipe neck. After filling the tank with fuel, the operator must securely screw the threaded cap onto the fill pipe neck. If the cap is not properly and tightly secured, engine vibration tends to loosen the connection between the tank cap and the fill pipe neck. Continued vibration between these loosened components wears the tank cap threads against the fill pipe threads, damaging the fill pipe threads. After enough thread wear, the tank cap can no longer be sufficiently tightened on the damaged threads of the fill pipe neck to prevent leakage of fuel from the tank. Leaking fuel creates a characteristic streak of grime, leaving a "leak trial" down the side of the tank and calling the situation to the attention of inspectors who will "red tag" the truck, removing it from the highway until the leaking fill pipe is repaired.

Repairing a leaking fill pipe generally requires replacing the entire fuel tank. This can take from several hours to days, depending on the availability of parts and services at the rig's location. The cost of a new aluminum diesel fuel tank alone is typically between $500 and $1,000. This cost does not include labor or account for lost revenue and other collateral losses arising from the rig's down-time while the tank is replaced. The total costs, therefore, for a single leaking fill pipe can exceed $2,000.

Accordingly, a device is needed to create a durable repair of a leaking tank fill pipe while impeding theft of fuel from the tank by siphoning.

SUMMARY OF EMBODIMENTS

The present invention discloses a fill-pipe anti-siphon device and method of use.

Disclosed is a tank fill pipe anti-siphon device comprising an elongate body bounding an inner volume, wherein the body comprises a first end open and providing access to the inner volume, a second end bounding the inner volume, a side bounding the inner volume and having a first opening; a lip; and a sealing member.

In some embodiments, the second end further comprises a second opening. In some embodiments, the body further comprises a cap retainer aperture. In some embodiments, the first opening is elongate. In some embodiments, the first opening has a variable width. In some embodiments, the variable width is greatest nearest the body second end and smallest nearest the body first end. In some embodiments, one first opening has a variable width and one first opening has a constant width. In some embodiments, the first opening nearest the cap retainer aperture has a constant width. In some embodiments, fuel exits the inner volume through the first opening nearest the body second end and air enters the inner volume through the first opening nearest the body first end during fueling. In some embodiments, the anti-siphon device further comprises a fill pipe repair collar.

Disclosed is a fuel tank comprising a tank fill pipe anti-siphon device comprising an elongate body bounding an inner volume, the body comprising a first end open and providing access to the inner volume; a second end bounding the inner volume; a side bounding the inner volume and having a first opening; a lip; and a sealing member.

In some embodiments, the fuel tank further comprises a semi-truck tractor attached to the fuel tank body.

Disclosed is a method for using a tank fill pipe anti-siphon device comprising inserting a tank fill pipe anti-siphon device into a fill pipe; coupling a fill pipe repair collar onto a fill pipe over the anti-siphon device; and sealing the repair collar on the fill pipe.

In some embodiments, the method further comprises dispensing fuel through the anti-siphon device into a fuel tank. In some embodiments, the method further comprises venting air from the fuel tank through the anti-siphon device while simultaneously dispensing fuel through the anti-siphon device into the fuel tank. In some embodiments, the method further comprises clipping a fuel tank cap to the anti-siphon device.

The foregoing and other features and advantages of the present invention will be apparent from the following more detailed description of the particular embodiments of the invention, as illustrated in the accompanying drawings.

DETAILED DESCRIPTION OF EMBODIMENTS OF THE INVENTION

Figure 1:
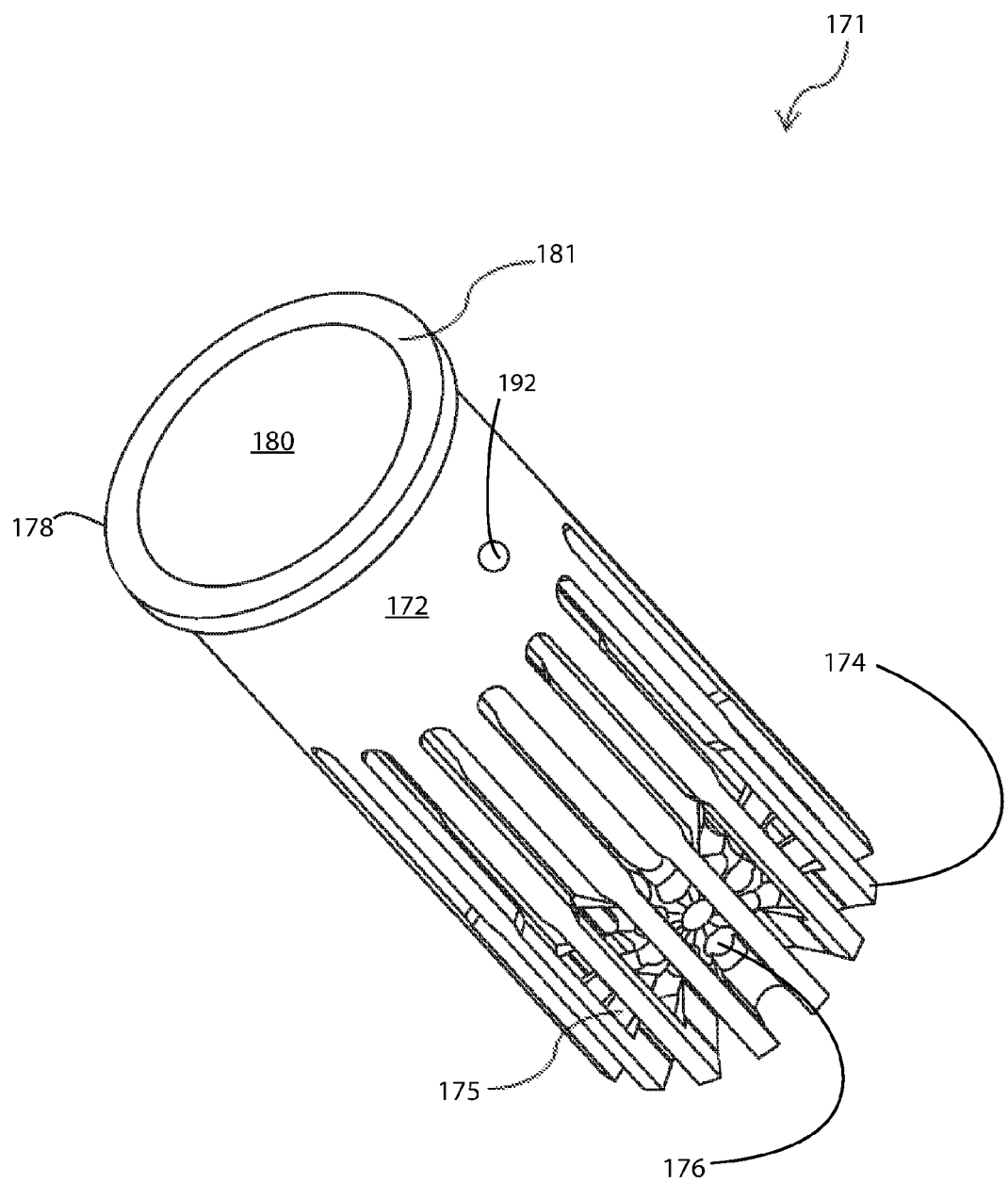
FIG. 1 is a top perspective view of a fill pipe anti-siphon device.

Operators of semi-tractor trailer trucks require a reliable, simple means to deter theft of diesel fuel. A typical truck has two matching fuel tanks, each with a capacity of 150 gallons. Given a price of diesel fuel of $3.50 USD/gallon, for example, over $1000 worth of fuel may be siphoned from the tanks and stolen. Several devices, therefore, are available to deter or prevent theft.

These available devices fall into two general categories: 1) locking devices; and 2) blocking devices. These devices are generally effective, however each category of device design has its disadvantages. Locking devices require a key, which may become lost or damaged. The key can break off in the lock. The lock itself may become damaged by dirt or repeated use. A locking fuel tank cap may be defeated and removed in seconds by one blow from a hammer to a screwdriver wedged into the lock. Blocking devices typically fit within the fill pipe neck and prevent the insertion of a siphon hose beyond the end of the device into the depths of the tank. Blocking devices, however, are defeated simply by removing the device from the fill pipe neck. Some devices have retractable fins or tabs which protrude and catch on the inside of the fuel tank following insertion of the device, preventing removal. These protruding tabs can usually be broken off, however, with a heavy screwdriver inserted between the fill neck and the device almost as easily and quickly as destroying a cap lock.

Accordingly, an anti-siphon device is needed which prevents insertion of a siphoning hose into the body of the fuel tank, which is impossible to remove without special tools and cannot be removed rapidly.

A fill pipe repair collar 100 has been previously described (see application Ser. No. 14/260,637, incorporated entirely herein by reference). Embodiments of fill pipe repair collar 100 with a non-faceted, generally circular outer surface, whether textured or polished smooth, are installed and removed using a strap wrench. The fill pipe repair collar "locks" to a fill-pipe neck by using a strap wrench to tightly couple the threaded collar onto the fill pipe neck. A retaining mechanism 201 of fill pipe repair collar 100, in including a retaining member 200 such as a set screw or other fastener, can then be inserted through a side hole in the body of the repair collar to engage with the fill pipe neck, making removal of the repair collar from the fill pipe essentially impossible without first removing the fastener. In some embodiments, the fastener is a set screw with a recessed hex-head or Torx™ head for removal. Therefore two specialized tools—a strap wrench and a hex-head wrench or their equivalents—are needed to remove the fill pipe repair collar which has been tightly coupled to the fill pipe neck. A would-be thief wielding a hammer and screwdriver would only be able to remove a properly installed fill pipe repair collar with considerable noise, time, and difficulty, if at all, with only these tools.

An anti-siphon device is disclosed. When coupled with a fill-pipe repair collar, the properly installed coupled device provides a means for the simple repair of fuel leaks from a poorly fitting cap while preventing theft of fuel by siphoning. When used in conjunction with a fill pipe repair collar, rapid removal of the device is impossible without special tools. The device is of a simple design and cannot be easily defeated for the reasons described herein below.

FIG. 1 is a top-perspective view of an anti-siphon device 170 with a body 172, a first (proximal) end 184, and a second (distal) end 185. The overall shape of device 170 is generally cylindrical, in some embodiments. A generally cylindrical shape is compatible with the shape of a fill pipe, within which device 171 is inserted. Portions of device 171, however, may present a rectangular, triangular, ovoid, or other conceivable shape in cross section. Device 171 is of unitary construction (with the exception of a first sealing member 182 of device 171). In some embodiments, device 171 is cut from aluminum metal. Working prototypes of some embodiments of the invention were cut and machined from a solid cylinder of aluminum metal. In other example embodiments, device 171 may be made of steel or other metals and metal alloys, plastics or other solvent-resistant polymers, or any other material suitable for the particular application. The type of material used should suit the particular application, such as contact with an aluminum fill-pipe neck and insertion into diesel fuel, for example. The example materials disclosed herein are not meant to be limiting.

FIG. 1 shows a first sealing surface 181 of device 171 and a lip 178, both located in proximity to a first end 180 The outer diameter of lip 178 is greater than the inner diameter of the fill-pipe neck such that, when device 171 is fully installed through a fill-pipe neck, lip 178 engages the external opening of the fill-pipe neck preventing device 171 from dropping completely into the fuel tank. The top surface of lip 178 comprises first sealing surface 181 of device 171. When device 171 is installed coupled with fill pipe repair collar 100, first sealing surface 181 of device 171 engages sealing member 127 of fill pipe repair collar (see FIG. 5).

In some embodiments, device 171 is designed to be used with fill pipe neck repair collar 100. In embodiments where fill pipe repair collar 100 is used with device 171, rim 178 of anti-siphon device 171 engages directly with sealing member 127 of a fill pipe neck repair collar 100 (shown in FIG. 6). In some embodiments, device 171 is installed into a fill pipe neck without fill pipe repair collar 100. Cap 190, in these and other embodiments wherein fill pipe repair collar is not used, secures device 171 within fill pipe neck in the absence of fill pipe neck repair collar 100. This however, circumvents the function of anti-siphon device 171 because without fill pipe neck repair collar 100, device 171 can be simply lulled out of the tank fill pipe neck after removal of cap 190 and a siphon hose or tube passed directly into the body of the fuel tank. To be effective in some embodiments, therefore, anti-siphon device 171 should be used in conjunction with fill pipe neck repair collar 100.

As also shown in FIG. 1, first end 184 is open and receives a fuel pump fill nozzle during refueling. A fill nozzle of a diesel fuel pump typically found at a gas station for automobiles has a small-diameter nozzle and a flow rate limited to no greater than 10 gallons per minute in the U.S. Truck stop diesel fuel pumps have a large-diameter fill nozzle to accommodate a much higher flow rate, as high as 60 gallons per minute. First end 180 must, therefore, have an inner diameter large enough to allow insertion of a high-flow fill nozzle with adequate space between the fill nozzle and the inner diameter of first end 180 to allow air to freely exit the fuel tank during high-flow fueling. In some embodiments, first end 180 first end 184 has an inner diameter of 5.5 to 6.5 cm. This is by example, and not meant to be limiting.

When installed, device 171 passes through a tank fill neck opening such that body 172 is within the fill pipe neck and in some embodiments and depending upon the tank design, partially into the body of the fuel tank. The overall length of device 171 is important. A longer device 171 will extend well into the fluid contents of a filled tank, permitting the siphoning a quantity of fuel of other fluid from the tank until the tank contents have been depleted to where device 171 no longer extends a sufficient distance into the fuel to allow siphoning. A shorter device 171 will partially limit the passage of a high-flow fill nozzle an adequate distance into the tank to prevent fuel from foaming-up around the nozzle with spillage during refueling. In some embodiments, device 171 has an overall length of between 15 and 17 centimeters. This is by way of example; lengths of less than 16 or greater than 17 centimeters are also possible, depending upon other characteristics of the device and the fill-pipe neck discussed further herein below.

Figure 2:
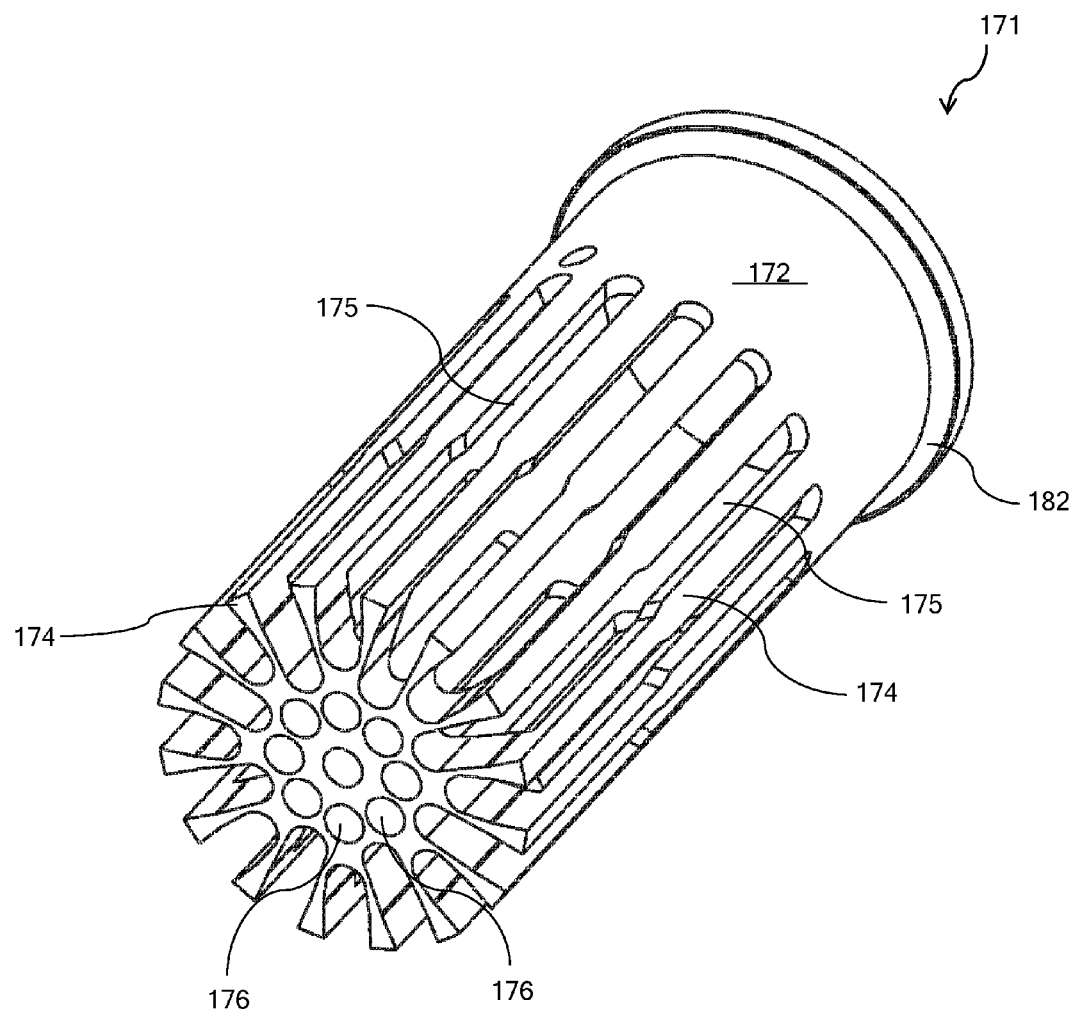
FIG. 2 is a bottom perspective view of a fill pipe anti-siphon device.
Figure 3:
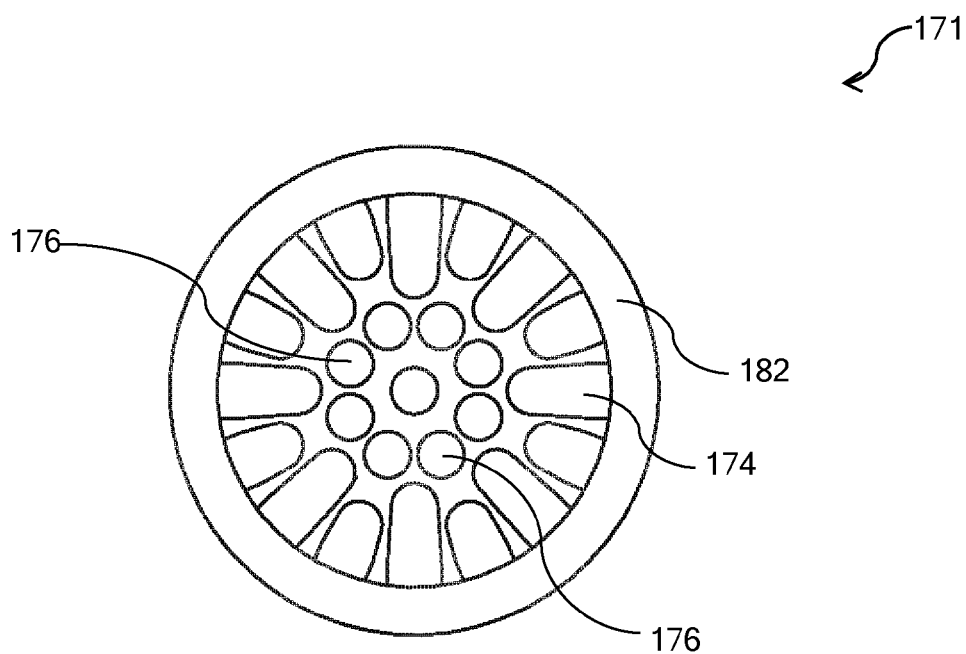
FIG. 3 is a top view of a fill pipe anti-siphon device.
Figure 4:
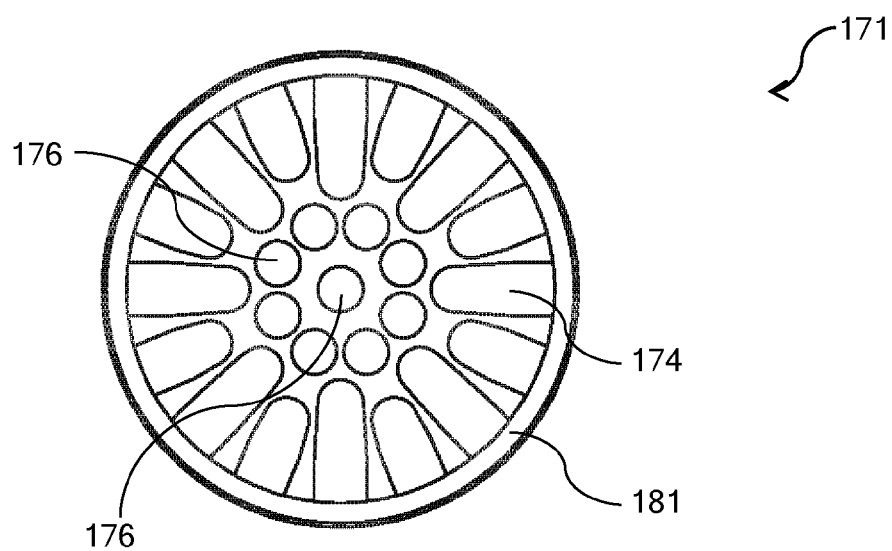
FIG. 4 is a bottom view of a fill pipe anti-siphon device.

Device 171 also has a first opening 175 and a rib 174 located on body 172, and a second opening 175 located on second end 185. First opening 175 is an aperture through the side of body 172. FIG. 1 and the other drawing figures show first opening 175 as elongate. In some embodiments not shown, first opening 175 is circular. The shape of first opening 175 is not meant to be limiting; rather, first opening 175 or a plurality of first openings 175 function during fueling to allow fuel to flow across anti-siphon device 171 into the fuel tank while simultaneously allowing air and fumes to vent from the fuel tank through anti-siphon device 171. The number and size of first openings 175 are, therefore, relevant to the proper functioning of device 171 and are discussed in detail herein below. In some embodiments, first opening 175 extends from body 172 through second end 185, as shown in FIG. 2, FIG. 3, and FIG. 4. The embodiment of device 171 shown in FIG. 1 and the other drawing figures has a plurality of first openings 175 separated by a plurality of ribs 174.

Additionally, some embodiments of device 171, including the embodiments shown in the various drawing figures, further comprise a second opening 175 within second end 185. The embodiment of device 171 shown in FIG. 1 and the other drawing figures comprises a plurality of first openings and second openings. Second end 186 extends through the fill-pipe neck partially into the body of a fuel tank. A typical diesel fuel tank fill-pipe neck of a semi-truck is 9 cm to 12 cm long. It may be preferable for device 171 to extend a distance into the body of a fuel tank beyond the extent of the tank's fill-pipe neck to facilitate high-flow fueling without the reflux of fuel backward around the fill nozzle, creating a hazardous fuel spill.

The size, number, and shape of first openings 175, ribs 174, and second openings 175 are important to facilitate fueling at flow rates of up to 60 gallons per minute without fuel spillage or a means to allow siphoning of fuel at a significant rate. An opening in an anti-siphon device allowing the passage of fuel will also allow the passage of a siphon hose. A small opening limits the diameter of siphon hose. A small siphon hose is a large impediment to efficient siphoning of fuel. Conversely, a small opening does not allow rapid fueling. Some embodiments of the invention address these limitations by comprising a plurality of relatively small first openings 175 and second openings 176, as shown in the drawing figures.

As shown in FIG. 1, in some embodiments, a cap retainer aperture 192 is located in body 172 proximal to first opening 175. Cap retainer aperture, when present, serves as an attachment point for a fastening means (not shown in the drawing figures) by which fuel cap 190 is loosely attached to device 171. Diesel semi-trucks have fuel caps with a chain or similar means to keep the fuel cap attached to the fuel tank when the cap has been removed for fueling. This chain acts as a loose leash connecting the fuel cap to the tank, keeping the cap from falling on the ground or becoming misplaced. One end of the chain is attached to the under-surface of the fuel cap and the other end it typically clipped to the inner terminus of the fill neck a short distance within the fuel tank body, such that when the fuel cap is screwed onto the fill neck, this chain hangs inside the fill neck of the fuel tank. When device 171 is installed in a fuel tank fill neck, however, the fill neck terminus is not accessible. Fill neck anti-siphon device 171, therefore, in some embodiments, comprises cap retainer aperture 190 as shown is FIG. 1 to allow an accessible point to attach a fuel cap chain or other cap retention means.

FIG. 2 is a bottom perspective view of anti-siphon device 171. FIG. 2 shows an embodiment with a plurality of second openings 176. In this example embodiment, each second opening 176 is approximately 8 mm in diameter. Additionally, first openings 175 extend through second end 185, also shown in FIG. 2. By utilizing a plurality of second openings 176 and first openings 175 in the example arrangement present in the embodiment shown in FIG. 2, resistance to the flow of fuel through the anti-siphon device is reduced while still providing a barrier to passage of a siphon hose of an adequate diameter through any opening in second end 185 of device 171.

FIG. 2 also shows a first sealing member 182 of device 171. First sealing member 182, in some embodiments, is a gasket made from an elastomeric material, such as a synthetic rubber, plastic, or other elastomer. In still other embodiments of the invention, first sealing member 182 is an O-ring made from elastomeric material. The materials suggested are by way of example only; other possible materials for use in the sealing member 127 will be apparent to those skilled in the art. First sealing member 182 of device 171 is readily removable from body 172 of device 171, and may be replaced if sealing member 182 becomes damaged or worn. First sealing member 182 of device 171 encircles body 172 and contacts second sealing surface 181 (not shown in FIG. 2; shown in FIG. 5). When anti-siphon device 171 is installed on a fuel tank and secured by fill pipe repair device 100 or cap 190, first sealing member 182 contacts the terminus of the fill pipe neck and forms a leak-resistant seal between second sealing surface 125 of fill pipe neck and second sealing surface 181 of anti-siphon device 171. In some embodiments, first sealing member 182 is a standard rubberized O-ring. In some embodiments, first sealing member is a soft, non-elastomeric polymer. In some embodiments, first sealing member 182 is a hard-rubber gasket. None of these compositions or descriptions is meant to be limiting. Many other suitable shapes and compositions of first sealing member 182 which are commonly available may be used.

It is appreciated upon careful viewing of FIG. 2 that first openings 175, in the embodiment shown and some other embodiments are narrow near first end 184 and then widen at a point roughly ⅔ of the distance along device 171 from first end 184 to second end 185. This is because when fueling, fuel flows into the fuel tank largely through second openings 176 and the distal, wider portions of first openings 175 while air exiting the fuel tank during fueling simultaneously flows out of the tank between the wall of the fill pipe neck and device 171 through the proximal, narrower portions of first openings 175. Air is less viscous than diesel fuel and therefore flows with less resistance through an opening so that first openings 175 can be narrower along the proximal portion of device 171 surrounded by the fill pipe neck, when installed. When some embodiments of the invention measuring between 14 and 17 centimeters in length are installed into a typical semi-truck diesel fuel tank with a fill pipe neck length of between 9 and 12 centimeters in length, the wide, distal segments of first openings 175 extend from the fill pipe neck into the body of the fuel tank and the narrow, proximal segments of first openings 174 remain within the fill pipe neck (see FIG. 6). Accordingly, while fueling, fuel flows directly into the body of the fuel tank through the wider distal segments while air simultaneously flows out of the tank between the fill pipe neck and anti-siphon device 171 through the narrower, proximal segments of first openings 175.

Narrowing the proximal portions of first openings 175 allows for wider ribs 174 more proximately, as shown in FIG. 2, which increases the strength and rigidity of device 171. Additionally, a narrow proximal portion of any first opening 175 located proximate to cap retainer aperture 192 on body 172 tends to prevent a tank cap retaining means from becoming lodged within first opening 175.

FIG. 3 and FIG. 4 show a top and a bottom view respectively of device 171. FIG. 3 demonstrates the relatively broad and flat first sealing surface 181 present in the embodiment shown, and some other embodiments. When anti-siphon device 171 is installed on a fuel tank with fill neck repair collar 100, in some embodiments, first sealing surface 181 of device 171 contacts sealing member 127 of fill neck repair collar 100, forming a leak-resistant seal. When anti-siphon device 171 is installed on a fuel tank without fill pipe repair collar 100, first sealing surface 181 of device 171 contacts cap sealing member 191 of cap 190, also forming a leak-resistant seal. Also shown in FIG. 3 and FIG. 4 is an example patter of second openings 176 and first openings 175 which are used in some embodiments to minimize resistance to flow of fuel into the tank for the reasons discussed herein above. This arrangement is by way of example; other arrangements may be used in other embodiments of the invention not pictured in the figures. FIG. 4 shows the lateral extent of a rim 178, largely obscured by first sealing member 182.

Figure 5:
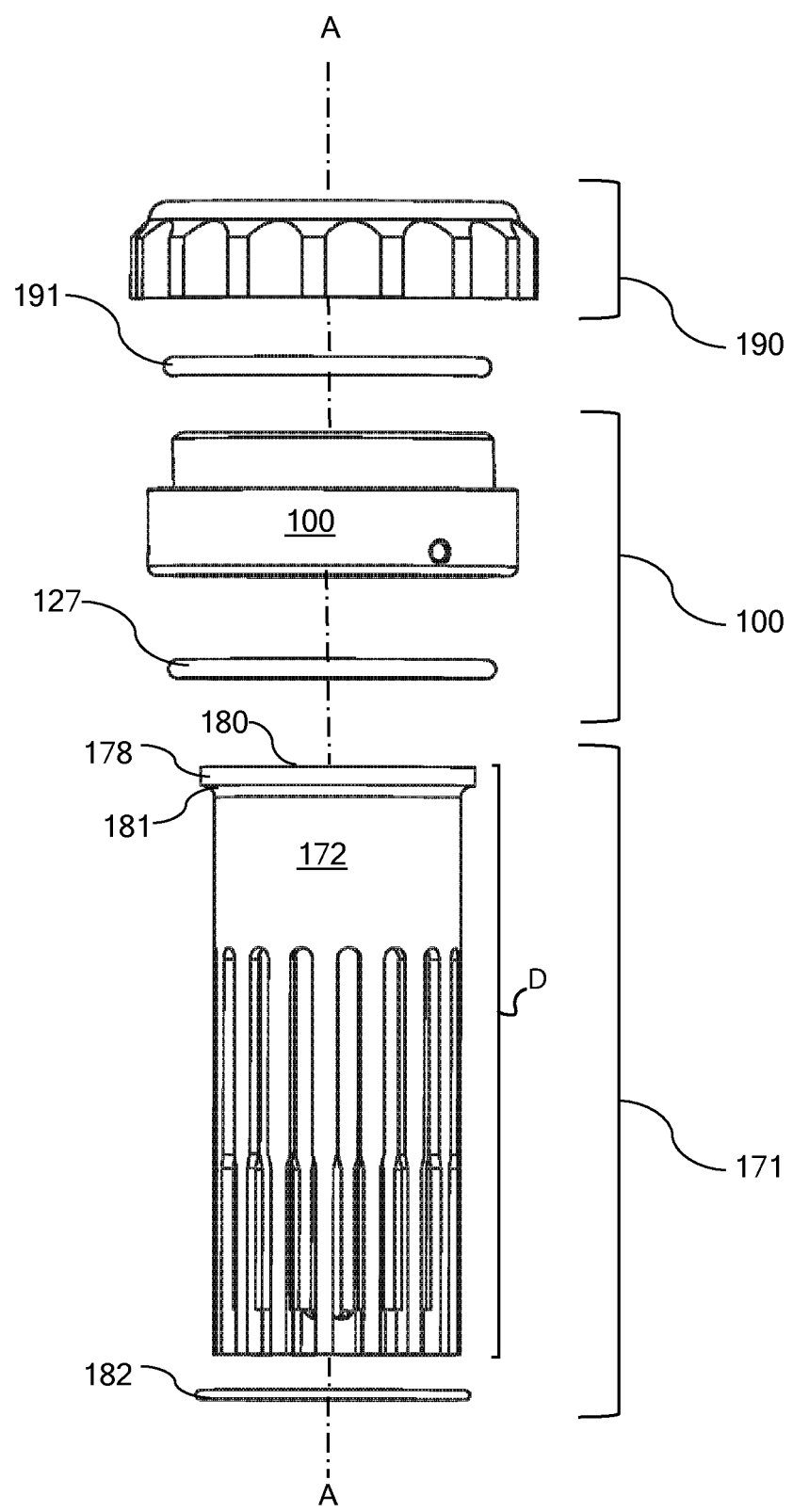
FIG. 5 is an exploded side view of a fill pipe anti-siphon device including a fill pipe repair collar and cap.

FIG. 5 shows an exploded side view of anti-siphon device 171 used with fill pipe repair collar 100 and cap 190. As shown in the figure, repair collar 100 fits over anti-siphon device 171 with sealing member 127 of repair collar 100 forming a leak-resistant seal between anti-siphon device 171 and repair collar 100. FIG. 5 also shows first sealing member 182 of anti-siphon device 171 separated from device 171. When installed, first sealing member 182 of anti-siphon device 171 encircles body 172 and contacts second sealing surface 181 of device 171, sealing device 171 against rim 178 of a fill pipe neck 170 (shown in FIG. 6). FIG. 5 also discloses line A-A which marks the plane of a longitudinal cross section through the radial center of device 171, shown by FIG. 6.

Figure 6:
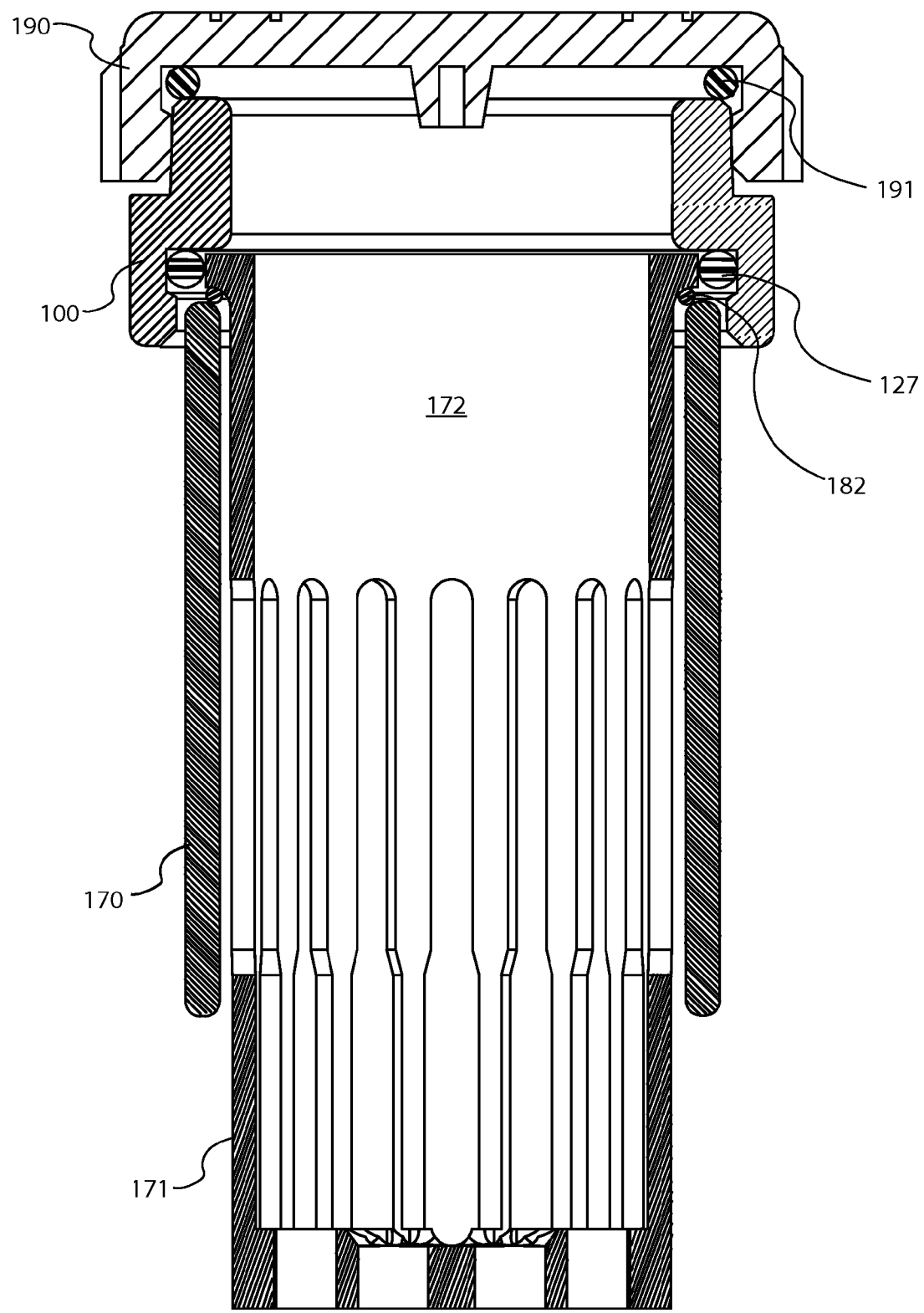
FIG. 6 is a magnified cross-sectional view through plane "A-A" of FIG. 5 of a fill pipe anti-siphon device installed in a fuel tank fill pipe neck, including a fill pipe repair collar and cap.

FIG. 6 shows a magnified cross-sectional view taken through device 171 at plane A-A of FIG. 5. Shown in the example FIG. 6 embodiment is fill pipe anti-siphon device 171 installed in fuel tank fill pipe neck 170, including fill pipe repair collar 100 and fuel tank cap 190. As seen in FIG. 6, device 171 is installed within the lumen of fill pipe neck 170. When installed, first sealing member 182 engages fill pipe neck 170, sealing device 171 with fill pipe neck 170. Also shown is sealing member 127 of repair collar 100. When device 171 is installed with repair collar 100, sealing member 127 seals repair collar 127 to device 171. Cap sealing member 191, in turn, seals tank cap 190 to repair collar 100 in embodiments wherein repair collar 100 is installed with anti-siphon device 171.

Figure 7:
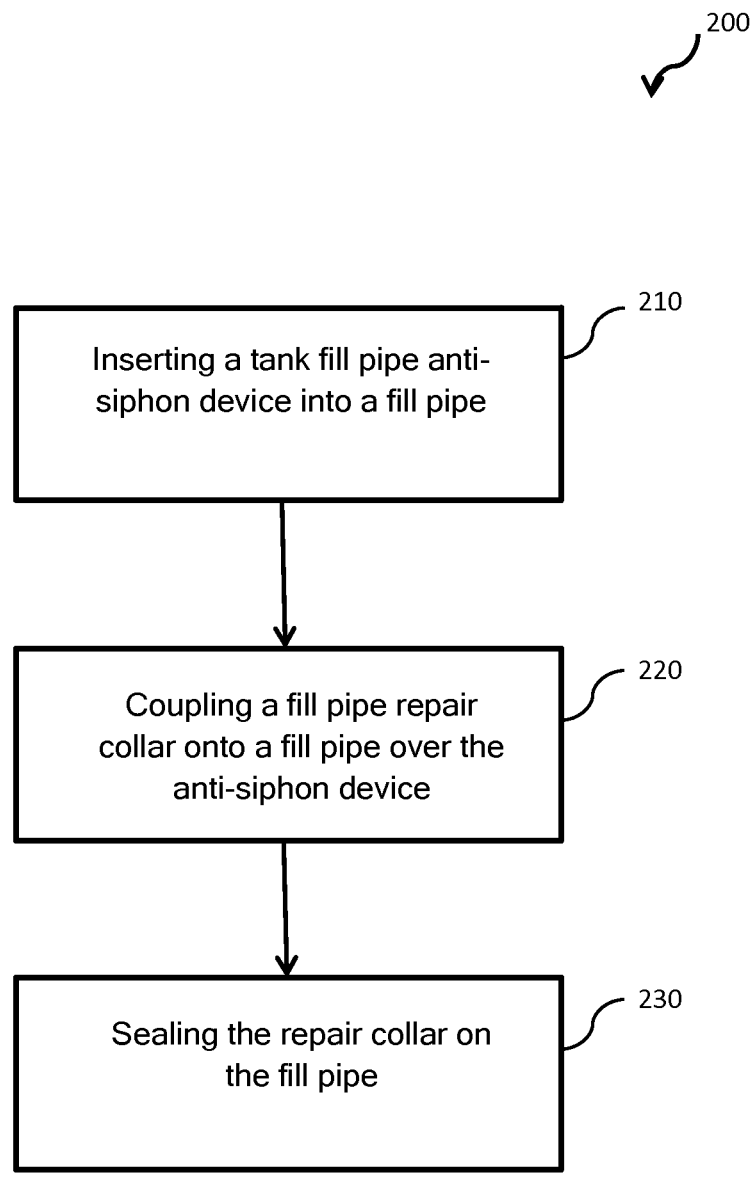
FIG. 7 is a flowchart diagramming a method of installing a fill pipe anti-siphon device.

FIG. 7 shows a method 200 of for using a tank fill pipe anti-siphon device. Method 200 includes an inserting step 210, inserting a tank fill pipe anti-siphon device into a fill pipe. In sealing step 210, device 171 is passed into fill pipe neck 170 until first sealing member 182 engages the rim of fill pipe neck 170. Method 200 also includes coupling step 220, coupling a fill pipe repair collar onto a fill pipe over the anti-siphon device. In coupling step 220, repair collar 100 is threaded onto fill pipe neck 170 over rim 178 of anti-siphon device 171 and hand-tightened in some embodiments. Method further comprises sealing step 230, sealing the repair collar on the fill pipe. Sealing step 230 includes further tightening repair collar 100 by hand in some embodiments, or by using a strap wrench or other suitable tool in some embodiments. In some embodiments, sealing step 230 additionally includes locking repair collar 100 onto fill pipe neck 170 over snit-siphon device 171 with fasteners or other means previously described (see application Ser. No. 14/260,637).

In some embodiments (not shown in FIG. 7), method 200 further comprises a dispensing step, wherein fuel or other liquid is dispensed into a tank through the installed anti-siphon device. The design of first opening(s) 175 and second openings 176 described herein above facilitates smooth flow of fuel or other liquid through anti-siphon device 171 while simultaneously venting air from the tank, also as described herein. In some embodiments method 200 further comprises a clipping step, whet em a fuel tank cap is clipped to the anti-siphon device 171 by means described herein, in some embodiments.

This invention overcomes the aforementioned and other difficulties encountered with using prior art, like the need to decrease the theft of diesel fuel using art effective, simple device, for example. The widespread availability of a fill pipe anti-siphon device enables companies and operators utilizing tractor-trailer trucks to transport goods to reduce theft and thereby reduce operating costs. This invention also has applications for use in many other situations requiring the creating of a durable, straightforward, and reliable repair of a damaged tank fill pipe neck.

Exceptional results can be obtained with the fill pipe anti-siphon device apparatus and method of use described in the various embodiments of the invention. The device is inexpensive to manufacture, functionally simple, and easy to use. Thus, the disclosed method of use and various embodiments of the fill pipe anti-siphon device have immediate applicability in the trucking and transportation industries, and similarly across other applications.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above.

What is claimed is:

1. A tank fill pipe anti-siphon device comprising:
an elongate unitary body bounding an inner volume, the unitary body comprising:
- a first end open and providing access to the inner volume;
- a second end bounding the inner volume;
- a side bounding the inner volume and having a plurality of first openings which are elongate, wherein a portion of the plurality of first openings has a constant width and the remainder of the plurality of first openings have a variable width;
- a lip; and
- a sealing member.

2. The anti-siphon device of claim 1, wherein the second end further comprises a second opening.

3. The anti-siphon device of claim 1, wherein the unitary body further comprises a cap retainer aperture.

4. The anti-siphon device of claim 1, wherein the variable width is greatest nearest the body second end and smallest nearest the body first end.

5. The anti-siphon device of claim 3, wherein the first opening nearest the cap retainer aperture has a constant width.

6. The anti-siphon device of claim 4, wherein fuel exits the inner volume through the first opening nearest the body second end and air enters the inner volume through the first opening nearest the body first end during fueling.

7. The anti-siphon device of claim 1, wherein the device further comprises a fill pipe repair collar.

8. A method for using a tank fill pipe anti-siphon device comprising:
- inserting a tank fill pipe anti-siphon device into a fill pipe;
- coupling a fill pipe repair collar onto the fill pipe over the anti-siphon device;
- sealing the repair collar on the fill pipe wherein a sealing member engages a terminus of a fill pipe neck and wherein sealing the repair collar on the fill pipe further comprises locking the repair collar with fasteners; and
- preventing the efficient siphoning of fuel from a tank.

9. The method of claim 8, further comprising dispensing the through the anti-siphon device into a fuel tank.

10. The method of claim 9, further comprising venting air from the fuel tank through the anti-siphon device while simultaneously dispensing fuel through the anti-siphon device into the fuel tank.

11. The method of claim 8, further comprising clipping a fuel tank cap to the anti-siphon device.

12. The anti-siphon device of claim 1, wherein the lip comprises a first sealing surface.

13. The anti-siphon device of claim 1, further comprising an overall length of between about fifteen (15) centimeters and about seventeen (17) centimeters.

* * * * *

UNITED STATES PATENT AND TRADEMARK OFFICE
CERTIFICATE OF CORRECTION

PATENT NO. : 9,527,379 B2  
APPLICATION NO. : 14/570618  
DATED : December 27, 2016  
INVENTOR(S) : Carlos Davito Page 1 of 1

It is certified that error appears in the above-identified patent and that said Letters Patent is hereby corrected as shown below:

On the Title Page

Line 10 of the Abstract should read; --...venting air from the tank...--

In the Claims

Lines 13-14 of Claim 9 should read; --...further comprising dispensing fuel through...--

Signed and Sealed this
Sixteenth Day of May, 2017

Michelle K. Lee
*Director of the United States Patent and Trademark Office*